United States Patent [19]

Mayer

[11] 4,405,540

[45] Sep. 20, 1983

[54] HOT SPRUE VALVE ASSEMBLY FOR AN INJECTION MOLDING MACHINE

[75] Inventor: Bruno F. P. Mayer, Orange, Calif.

[73] Assignee: Discovision Associates, Costa Mesa, Calif.

[21] Appl. No.: 296,731

[22] Filed: Aug. 27, 1981

Related U.S. Application Data

[62] Division of Ser. No. 202,838, Oct. 31, 1980, Pat. No. 4,340,353.

[51] Int. Cl.³ .............................................. B29D 17/00
[52] U.S. Cl. ................................................... 264/106
[58] Field of Search .............. 264/106, 107, 161, 163, 264/328.9; 425/548, 549, 554, 556, 810

[56] References Cited

U.S. PATENT DOCUMENTS

| | | | |
|---|---|---|---|
| 3,010,156 | 11/1961 | Smith. | |
| 3,937,779 | 2/1976 | Simmons | 264/106 |
| 3,989,436 | 11/1976 | McNeely | 425/810 X |
| 4,171,941 | 10/1979 | Yotsutsuji | 425/146 |
| 4,260,360 | 4/1981 | Holmes | 425/810 X |

FOREIGN PATENT DOCUMENTS

| | | |
|---|---|---|
| 11805 | 6/1980 | European Pat. Off.. |
| 18210 | 10/1980 | European Pat. Off.. |
| 2039980 | 1/1971 | France. |
| 2054972 | 5/1971 | France. |
| 55-61438 | 5/1980 | Japan .................................. 425/566 |
| 1071340 | 6/1967 | United Kingdom. |
| 1125727 | 8/1968 | United Kingdom. |

*Primary Examiner*—Thomas P. Pavelko

[57] ABSTRACT

A hot sprue valve assembly is provided for controlling flow of molten material through a hot sprue bushing of an injection molding machine. The valve assembly is particularly designed for use with an injection molding machine for molding centrally apertured record discs, such as video information discs. The valve assembly includes a poppet valve movable between an open position to allow flow of molten disc-forming material into a mold cavity, and a closed position to prevent flow of the disc-forming material into the mold cavity. The poppet valve is designed to mold a central aperture in the disc upon movement to the closed position, and the valve assembly is designed to accommodate air ejector apparatus for removing a solidified record disc from the machine.

4 Claims, 4 Drawing Figures

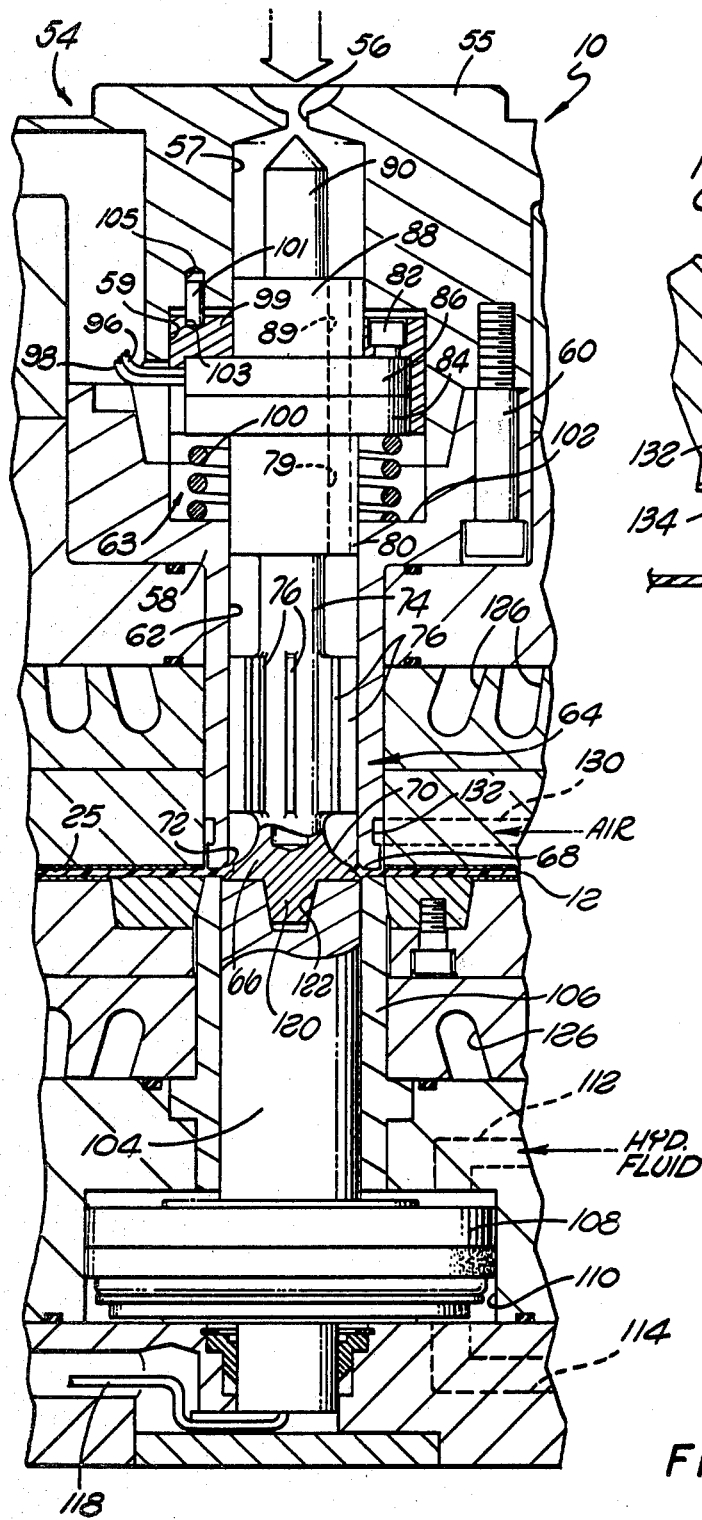
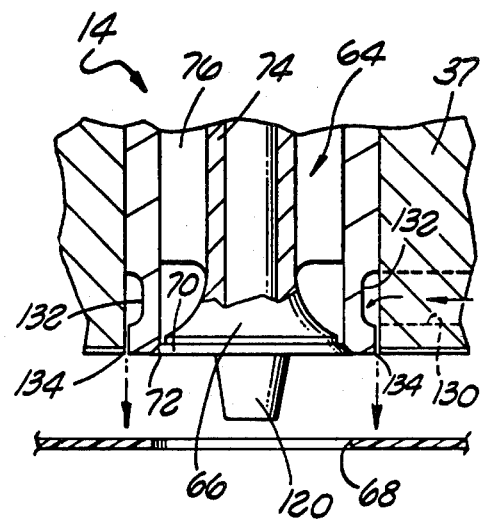
FIG. 4
FIG. 2

HOT SPRUE VALVE ASSEMBLY FOR AN INJECTION MOLDING MACHINE

This is a division of application Ser. No. 202,838, filed Oct. 31, 1980, now U.S. Pat. No. 4,340,353.

BACKGROUND OF THE INVENTION

This invention relates generally to injection molding machines and, more particularly, to injection molding machines including means for selectively opening and closing the hot sprue of a machine molding assembly designed for molding centrally apertured record discs, such as video information discs.

An example of an injection molding machine of this particular type is disclosed in copending and commonly assigned patent applications U.S. Ser. No. 847,367, filed in the name of J. R. Holmes et al., and entitled "METHOD AND MEANS FOR REPLICATING CENTRALLY APERTURED VIDEO DISC RECORDS", and U.S. Ser. No. 031,205, filed in the name of J. R. Holmes, and entitled "MOLDING APPARATUS FOR PRODUCING CENTRALLY APERTURED RECORD DISCS". The apparatus described in these applications comprises an injection molding machine having a molding assembly with first and second mold halves reciprocally movable between a closed position, wherein molten disc-forming material of plastic or the like is injected into an annular mold cavity to form a video information disc, and an open position wherein the mold parting line is opened and the resultant molded video information disc is removed from the machine. The annular mold cavity is defined by a pair of planar, disc-shaped stamping dies carried by platens which are in turn reciprocally movable toward and away from each other along with the respective mold halves.

In injection molding machines of this general type, it is well known to inject molten plastic material under pressure through an injection sprue bushing and into the mold cavity defined by the two disc-shaped stamping dies. When the mold cavity is filled with the molten plastic material, the surrounding machine structure including the respective mold halves and the sprue bushing are cooled by a circulating liquid coolant to reduce the temperature of the molten plastic material and thereby solidify the material. In this manner, the molded record disc is quickly solidified within the mold cavity whereupon the solidified disc can be removed from the machine and the cycle restarted, thereby allowing a rapid production rate of the record discs. However, a substantial amount of plastic material within the sprue bushing has a relatively large thickness compared with the plastic material within the mold cavity, whereby the plastic material within the sprue bushing takes the longest time to solidify. The cycle time for molding the record discs is therefore dependent upon the cooling time of the sprue material, and not upon the cooling time of the disc per se. Moreover, this sprue material when solidified comprises wasted plastic material which must be removed from the molded record disc, as by means of a punch assembly or the like, to yield the desired thin, substantially planar record disc including the required central aperture.

Formation of the central aperture by means of a conventional punch assembly of the type disclosed in the above-referenced copending applications poses a variety of problems in the production of the record discs. For example, the punch step requires a certain cycle time to perform, thereby prolonging the cycle time for each record disc. Moreover, the use of a punch assembly to form the apertures after solidification of the record discs results in aperture shapes having a concentricity dependent upon the state of wear of the punch assembly. As punch assembly wear progresses, the likelihood of the creation of debris in the vicinity of the aperture increases, and such debris can deleteriously affect the quality of subsequently molded record discs. Finally, the use of a punch assembly occasionally results in cracking of the discs in the region of the aperture, whereby the discs must be rejected as scrap.

Some attempts have been proposed to mold an aperture in the record disc prior to solidification of the disc-forming material, and thereby avoid use of a punch assembly. See, for example, copending U.S. application Ser. No. 202,824 filed Oct. 31, 1980 now U.S. Pat. No. 4,372,741, Feb. 8, 1983, filed in the name of A. Cane et al. and entitled "HOT SPRUE VALVE ASSEMBLY FOR AN INJECTION MOLDING MACHINE". However, the aperture-molding valve assembly of this application still requires a solidified portion of the disc-forming material with the region of the formed aperture to be removed from the machine as wasted scrap material.

The present invention provides an injection molding machine including an improved mold assembly particularly designed for use in making relatively thin, substantially planar record discs, such as video information discs, wherein the disc production rate is independent of the solidification time of molten plastic material in the sprue bushing region of the injection machine. The present invention fulfills this need by providing a valve assembly for isolating from the mold cavity the molten plastic material within the sprue bushing during solidification of the plastic material in the mold cavity while at the same time eliminating waste of any plastic material within the aperture region of the disc.

SUMMARY OF THE INVENTION

The present invention is embodied in a improved injection molding machine for use in producing centrally apertured record discs, such as video information discs. The machine includes a mold assembly having first and second mold halves reciprocally movable with respect to each other between a closed position wherein molten disc-forming material such as a molten plastic material is injected into an annular disc-shaped mold cavity to form a molded record disc, and an open position wherein the mold parting line is opened and the molded record disc can be extracted from the machine. At least one surface of the annular mold cavity is defined by a planar, disc-shaped stamping die carried by one of the two molds halves for use in imparting appropriate information to the surface of the molded disc.

According to the invention, the molding assembly for the machine includes a hot sprue bushing through which molten disc-forming material is maintained at an elevated temperature and is injected into the mold cavity. This hot sprue bushing defines a flow path positioned generally at a right angle to the plane of the mold cavity and aligned axially with the central axis of the mold cavity. The molten disc-forming material is thus injected into the mold cavity along an axis coincident with the central aperture to be formed in the molded record disc.

A hot sprue valve assembly is mounted on the machine generally in axial alignment with the hot sprue bushing and includes a poppet valve for opeining and closing the flow path in the hot sprue bushing to flow of the molten disc-forming material. This poppet valve is biased by a spring to a normal position seated upon the bushing to prevent flow of the molten disc-forming material into the mold cavity. However, when the material is placed under the influence of an injection pressure, the poppet valve is moved to an open position to allow the molten disc-forming material to flow into and fill the mold cavity.

An hydraulic ram is positioned on the side of the mold cavity opposite the sprue bushing, and is operable to advance toward the mold cavity to engage the poppet valve when the mold cavity is filled with the molten disc-forming material. The hydraulic ram bears against the poppet valve to return the valve to a closed position seated upon the sprue bushing. Importantly, this movement of the poppet valve occurs prior to solidification of the disc-forming material so that a central aperture is molded into the record disc having a shape corresponding to the shape of the poppet valve.

After the disc-forming material within the mold cavity has solidified, the mold parting line is opened with the valve spring maintaining the poppet valve in its seated or closed position. An air ejector assembly adjacent the sprue bushing is supplied with air under pressure to air-eject the solidified molded record disc from the machine.

In the preferred embodiment of the invention, the poppet valve is carried by a valve stem received within the sprue bushing. This valve stem is formed to include guide means engaging the interior wall of the bushing to assure accurate guided movement of the poppet valve with respect to the axis of the sprue bushing flow path. Importantly these guide means further define axially extending flow passages for relatively free passage of the molten disc-forming material through the sprue bushing flow path and into the mold cavity.

Other features and advantages of the present invention will become apparent from the following detailed description, taken in conjunction with the accompanying drawings which illustrate, by way example, the principles of the invention.

BRIEF DESCRIPTION OF THE DRAWINGS

The accompanying drawings illustrate the invention. In such drawings:

FIG. 2 is an enlarged fragmented cross sectional view illustrating the hot sprue valve assembly in an open position;

FIG. 4 is an enlarged fragmented cross sectional view illustrating ejection of a molded record disc from the machine.

DETAILED DESCRIPTION OF THE PREFERRED EMBODIMENT

Figure 1:
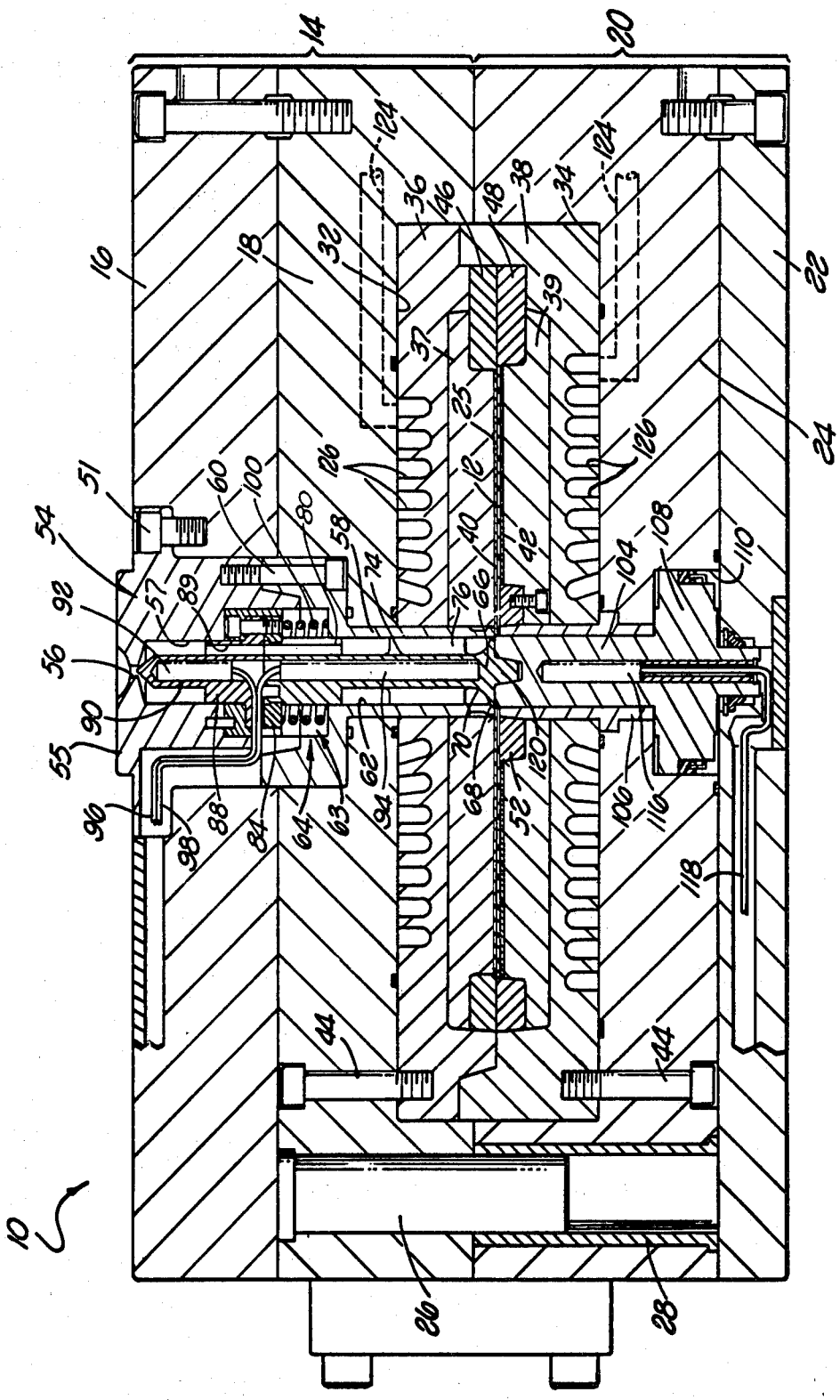
FIG. 1 is a simplified cross sectional view of an injection molding machine including a hot sprue valve assembly embodying the present invention.

Referring now to the drawings, and particularly to FIG. 1, there is shown a molding apparatus 10 for use in combination with an injection molding machine (not shown) to produce a centrally apertured record disc 12, such as a video information disc. One suitable molding machine in which the molding apparatus 10 can be used comprises a 375 ton model manufactured by the Stokes Division of Pennwalt Manufacturing Co.

The molding apparatus 10 comprises a first mold half 14 including a base plate 16 and a carrier plate 18, and a second mold half 20 including a base plate 22 and a carrier plate 24. The first and second mold halves 14 and 20 along with their associated base and carrier plates 16, 18 and 22, 24 are reciprocally movable toward and away from each other to open and close a relatively thin, substantially planar mold cavity 25 in which the record disc 12 is molded. More specifically, the mold halves 14 and 20 are movable between a closed position with their carrier plates 18 and 24 in abutting relation with each other as shown in FIG. 1, and an open position separated from each other (not shown in FIG. 1). A plurality of guide pins 26, one of which is shown in FIG. 1, are secured to the first mold half 14 and received slidably within bushings 28 in the second mold half 20 to maintain the two mold halves in close axial alignment with each other.

The carrier plates 18 and 24 of the two mold halves 14 and 20 respectively include annular plate-shaped recesses 32 and 34 facing toward each other generally in axial alignment for receiving annular platens 36 and 38, respectively. As illustrated, these platens 36 and 38 can be secured in position within the recesses 32 and 34 as by means of bolts 44, or the like. The platens 36 and 38 respectively carry removable support plates 37 and 39 which in turn carry disc-shaped stamping dies 40 and 42 having a surface configuration representative of the information to be cast into the record disc 12, and which cooperate with each other when the mold halves 14 and 20 are in the closed position to define the disc-shaped mold cavity 25 in which the disc 12 is injection molded. Annular rings 46 and 48 can be provided about the circumference of the mold cavity 25 for securing the support plates 37 and 39, and the stamping dies 40 and 42 in fixed positions upon their respective platens 36 and 38, all in a well-known manner. If desired, annular center clamps can also be provided for securing the stamping dies in position, such as the lower center clamp 52 shown in FIG. 1. The specific construction and operation of these various components is discussed in further detail in copending and commonly assigned U.S. application Ser. No. 031,205, filed Apr. 18, 1979, by John R. Holmes and entitled "APPARATUS FOR PRODUCING CENTRALLY APERTURED RECORD DISCS", the disclosure of which is incorporated herein by reference.

An injector assembly 54 is secured by a bolt 51 or the like to the base plate 16 of the first mold half 14, and this injector assembly 54 comprises a generally cylindrical collar 55 or block having a central inlet port 56 through which molten disc-forming material such as a molten plastic material is injected under pressure. More specifically, an injector gun assembly (not shown) supplies molten disc-forming material in an appropriate quantity and under appropriate pressure for passage through the inlet port 56 and further to the mold cavity 25. This injector gun assembly is generally conventional in the art, and thus it is not shown or described in detail herein.

Figure 3:
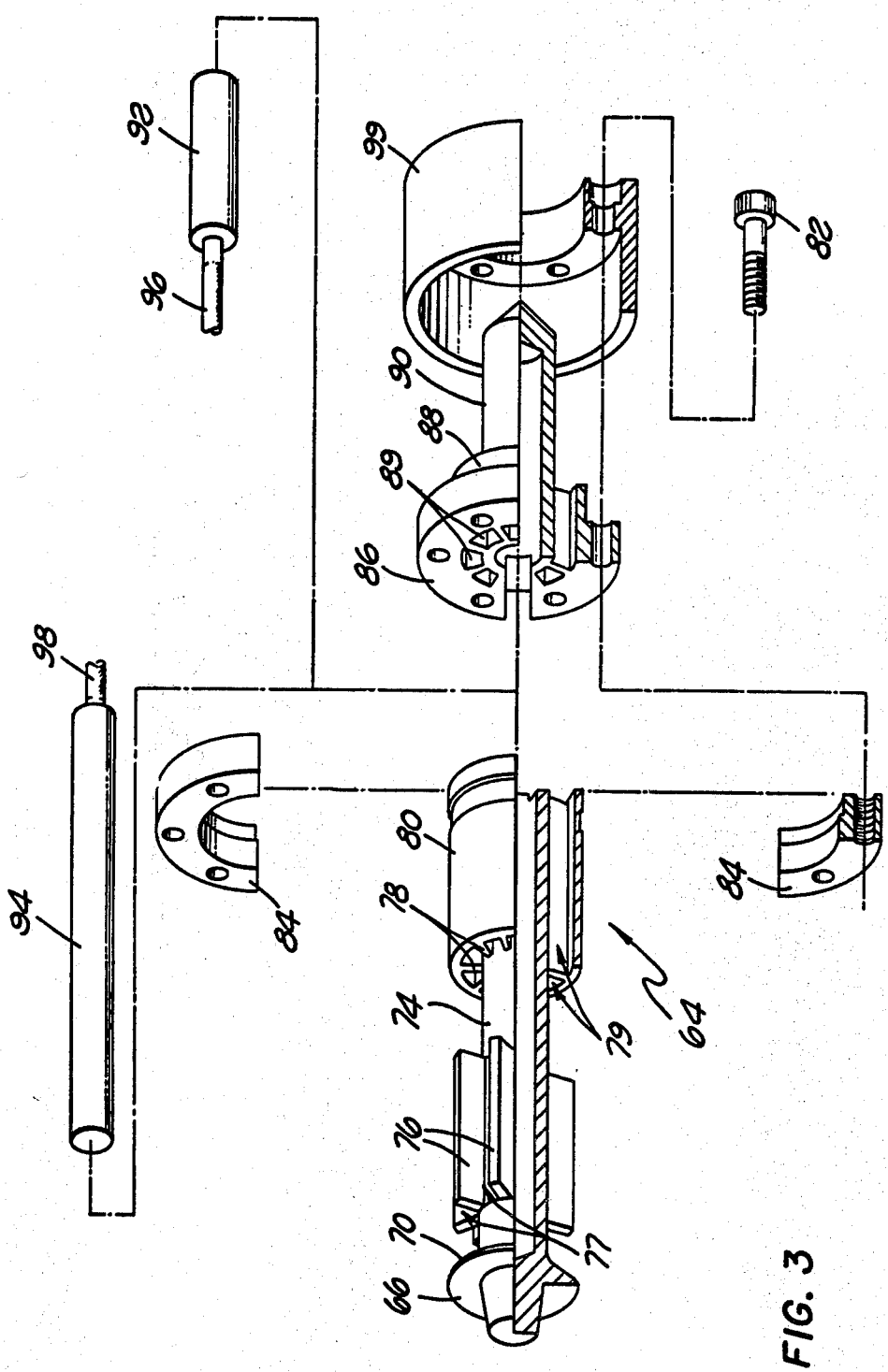
FIG. 3 is an exploded perspective view illustrating a portion of the valve assembly, with portions broken away.

The collar 55 of the injector assembly 54 includes an internal flow path 57 for receiving the molten disc-forming material injected through the inlet 56. As illustrated in FIGS. 1–3, the collar 55 has a lower end which is secured to the enlarged upper end of a hot sprue bushing 58 as by means of at least one bolt 60. The sprue bushing 58 includes an internal flow path 62 aligned with the injector assembly flow path 57 and extending downwardly into communication with the mold cavity 25. Importantly, as shown in FIGS. 1 and 2, the injector assembly and sprue bushing flow paths 57 and 62 are together oriented generally at a right angle to the plane of the mold cavity 25, and generally in alignment with the axial center of the mold cavity 25. Accordingly, the molten disc-forming material is supplied centrally to the mold cavity 25 and flows from the sprue bushing 58 in a radially outwardly direction to fill the mold cavity 25. The molten disc-forming material thereby conforms to the specific geometry of the mold cavity as defined by the two stamping dies 40 and 42 which include appropriate surface discontinuities representative of the prescribed information, such as video and/or audio information, to be imparted to the molded record disc.

The invention of this application comprises a hot sprue valve assembly 64 for controllably opening and closing the sprue bushing flow path 62 to flow of molten disc-forming material, and thereby control flow of the molten disc-forming material into the mold cavity 25. The valve assembly 64 includes a poppet valve 66 positioned generally at the end of the sprue bushing 58 adjacent the mold cavity 25 and movable to a closed position seated upon the sprue bushing 58. In this position, the poppet valve 66 isolates the molten disc-forming material with the sprue bushing flow path 62 from the mold cavity 25 so that the disc-forming material within the mold cavity can be solidified rapidly and substantially independently of molten disc-forming material within the sprue bushing 58. Moreover, the poppet valve 66 advantageously operates to mold a central aperture 68 of a desired size and shape in the disc 12, as will be described.

As illustrated in FIGS. 1-3, the poppet valve 66 has a generally circular cross sectional shape and includes a conically tapered rear valve seat face 70 for seated engagement upon a matingly shaped valve seat 72 defined by the adjacent end of the sprue bushing 58. The poppet valve 66 is formed integrally with a valve stem 74 which extends upwardly, as viewed in FIGS. 1 and 2, within the sprue bushing flow path 62 along the central axis thereof. This valve stem 74 is constrained for accurate sliding, guided movement along the axis of the flow path 62 by a plurality of radially outwardly extending arms 76. These arms 76 each have a substantial axial length and each has a carefully selected shape and contour for close sliding engagement with the interior wall surface of the sprue bushing 58. Moreover, these arms 76 are angularly spaced from each other to define axially extending openings 77 to allow substantially free and unrestricted passage of the molten disc-forming material through the flow path 62 in the sprue bushing.

The upper end of the valve stem 74 includes a second plurality of radially outwardly extending arms 78 (FIG. 3) which are angularly spaced from each other to define axially extending openings 79 to allow substantially free and unresricted passage of the molten disc-forming material. These latter arms 78 terminate at their radially outward extent in a guide cylinder 80 sized for sliding reception within the sprue bushing flow path 62. This guide cylinder 80 projects upwardly, as viewed in FIGS. 1 and 2, into an enlarged portion 63 of the flow path 62 at the upper end of the sprue bushing 58 where the guide cylinder 80 is secured in a suitable manner to a radially outwardly projecting annular flange 84.

The flange 84 is in turn secured as by screws 82 to a second, similarly-sized flange 86 of a valve stem cap 88. This latter flange 86 is received within a lower enlarged portion 59 of the injector assembly flow path 57. The valve stem cap 88 has a cylindrical shape for sliding reception within the narrow upper portion of the flow path 57, and is formed integrally with an upper extension 90 of smaller cross section projecting upwardly along the axis of the flow path 57. The valve stem cap 88 includes axially extending flow openings 89 for substantially free and unrestricted passage of molten disc-forming material in a downward direction through the injector assembly flow path 57 to the openings 79 formed by the arms 78 and the guide cylinder 80 of the upper end of the valve stem 74.

Both the valve stem cap 88 and the valve stem 74 are hollow for respective reception of heaters 92 and 94, such as electrical resistance heater cartridges. These heaters 92 and 94 are designed to maintain the temperature level of the molten disc-forming material as it flows through the injector assembly 54 and the sprue bushing 58 to the mold cavity. Appropriate electrical current is supplied to the heaters 92 and 94 by conductors 96 and 98 which extend outwardly from the injection assembly 54 through the cap flange 88 for suitable connection to an electrical power supply (not shown).

A relatively large spring 100 is positioned annularly about the guide cylinder 80 of the valve stem 74 within the upper enlarged postion 63 of the sprue bushing flow path 62. The spring 100 comprises a compression spring reacting between the flange 84 at the upper end of the guide cylinder 80 and an upwardly and axially presented shoulder 102 for the sprue bushing 58 within the enlarged flow path portion 63. Since the sprue bushing 58 is rigidly secured with respect to the first mold half 14, the spring 100 urges the flange 84 along with the entire valve assembly 64 in an upward direction as viewed in FIGS. 1 and 2. This moves the valve stem 74 upwardly within the sprue bushing flow path 62 to correspondingly move the poppet valve 66 to a normal seated position upon the sprue bushing valve seat 72.

The arms 76 about the stem 74 combine with the guide cylinder 80 and the valve stem cap 88 to constrain the entire valve assembly 64 for accurately guided axial motion with respect to the axis of the sprue bushing flow path 62. Conveniently, a cap sleeve 99 is received over the two flanges 84 and 86 for sliding movement within the enlarged portions 59 and 63 of the flow paths 57 and 63. This cap sleeve 99 is secured to the flanges 84 and 86 by the screws 82, and axial rotation of the entire subassembly is prevented by a guide pin 101 received respectively within slots 103 and 105 in the cap sleeve 99 and the injector assembly 54.

In operation of the machine, molten disc-forming material is injected under pressure through the injector assembly inlet 56 for passage through the flow paths 57 and 62 to the mold cavity 25. The pressure of the injected molten material is sufficient to overcome the force bias of the spring 100 and move the poppet valve 66 off the seat 72 to an open position. Such movement of the poppet valve 66 allows the molten disc-forming material to flow radially outwardly from the poppet valve 66 into the mold cavity 25 to fill the mold cavity. The heaters 92 and 94 maintain the disc-forming material within the flow paths 57 and 62 in a molten state at all times.

An hydraulic ram 104 is positioned on the side of the mold cavity 25 opposite the sprue bushing 58 to return the poppet valve 66 to a closed position seated upon the valve seat 72 when the mold cavity 25 is filled with the disc-forming material. More specifically, the hydraulic ram 104 is carried by the second mold half 20 within a guide sleeve 106 fixed in position with respect to the carrier plate 24 of the second mold half 20. This guide sleeve 106 is positioned in axial alignment with the sprue bushing 58 on the opposite side of the mold cavity 25, and slidably carries the ram 104 for movement toward and away from the mold cavity 25.

The hydraulic ram 104 includes at its end opposite the mold cavity 25 an enlarged piston 108 positioned within a matingly configured cylindrical chamber 110 formed between the base plate 22 and the carrier plate 24 of the second mold half 20. Hydraulic fluid ports 112 and 114 (FIG. 2) are formed in the carrier plate 24 and the base plate 22 to supply hydraulic fluid under pressure to the upper side of the piston 108 for moving the ram 104 in a downward direction away from the poppet valve 66, or to supply hydraulic fluid under pressure to the lower side of the piston 108 to move the ram 104 in an upward direction toward the poppet valve. Conveniently, as shown in FIGS. 1 and 2, the piston 108 and the ram 104 are hollow for reception of a heater 116 in the form of an electrical resistance heater cartridge or the like for which electrical current is provided as by means of a conductor 118.

The poppet valve 66 and the hydraulic ram 104 include matingly discontinuous surfaces for assuring accurate and guided axial alignment therebetween. For example, as shown, the poppet valve 66 includes a downwardly projecting lug 120 having a truncated conical shape for reception into a matingly configured recess 122 at the upper end of the ram 104.

When molten disc-forming material is injected into the mold cavity 25, as described above, the hydraulic fluid under pressure is supplied to the upper surface of the piston 108 to retract the hydraulic ram 104 to a position generally adjacent to, but not extending into, the mold cavity 25. When this occurs, the pressure of the injected disc-forming material is sufficient to move the poppet valve 66 to the open position shown in FIG. 2. The ram 104 provides a stop for axial movement of the poppet valve 66 and helps to assure accurate axial translation thereof.

After the mold cavity 25 is filled with the molten disc-forming material, the injector gun assembly (not shown) is typically operated in a known manner to reduce the pressure applied to the injected disc-forming material to a lower, so-called "hold" pressure for a predetermined time period. This allows the molten material to pack tightly within the mold cavity 25, and thereby overcome or compensate for effects of inherent shrinkage of the material. Importantly, however, this "hold" pressure is sufficient to maintain the poppet valve 66 in its open position of FIG. 2, while the hydraulic ram 104 is maintained in its retracted position.

After the predetermined "hold" time period, the injector gun assembly (not shown) substantially removes injection pressure from the molten disc-forming material. At the same time, the hydraulic ram 104 is operated by means of pressurized hydraulic fluid supplied to the lower surface of the piston 108 to engage and move the poppet valve 66 across the mold cavity upwardly to its closed position seated upon the valve seat 72. This closed position of the poppet valve 66 is shown in FIGS. 1 and 4. Importantly, the poppet valve 66 is sized and shaped to correspond with the desired size and shape of the central aperture 68 to be formed in the record disc 12, whereby this movement of the poppet valve 66 across the mold cavity functions to mold the aperture 68 into the disc prior to solidification of the disc-forming material.

With the poppet valve 66 in the closed position of FIGS. 1 and 4, the molten disc forming material within the sprue bushing flow path 62 is isolated from the molten disc-forming material within the mold cavity 25. At this time, the material within the mold cavity 25 can be solidified rapidly and substantially independently of the plastic material within the sprue bushing 58. More specifically, a cooling fluid such as water can be circulated in heat exchange relation with the mold cavity 25 via inlets 124 and through a plurality of coolant fluid flow passages 126 defined by the carrier plates 18 and 24 and their respective platens 36 and 38. This circulating coolant fluid reduces the temperature level of the disc-forming material within the mold cavity 25 and thereby solidies that material rapidly to form the molded record disc 12. Of course, this coolant fluid is circulated from these passages 126 via an outlet (not shown) to an appropriate heat exchanger or the like for reduction of the coolant fluid temperature and recirculation thereof to the mold assembly 10 through the inlets 124.

The hot sprue valve assembly 64 of this invention thus offers significant advantages over the prior art in that it is not necessary to wait for the molten disc-forming material within the sprue bushing 58 to solidify before the record disc 12 can be removed from the mold cavity 25. Alternately stated, it is necessary only to solidify the material having a relatively small thickness within the mold cavity 25 before the solidified record disc 12 can be removed from the machine and a subsequent molding cycle initiated. This significantly decreases the cycle time for producing a single record disc 12, and thereby substantially increases the overall disc production rate of the injection molding machine.

The hot sprue valve assembly 64 of this invention is further advantageous in that the cylindrical poppet valve 66 functions directly to mold the central aperture 68 into the record disc 12 prior to material solidification thereby eliminating the need for punching or other post-solidification formation of the central aperture. This molding technique eliminates waste of disc-forming material from the aperture region of the resultant molded disc 12, and further eliminates any need to grind or otherwise machine the size and shape of the central aperture to a final size. This technique also prevents possible cracking of the disc 12 or the creation of small debris during punching which can become trapped within the mold cavity 25 and deleteriously affect subsequent record disc formation. Still further, the use of the poppet valve 66 to mold the central aperture eliminates the requirement for periodic replacement of a conventional punching apparatus which can wear over a period of time.

As soon as the disc-forming material within the mold cavity 25 has solidified to form the molded record disc 12, the mold cavity 25 is opened in a conventional manner to expose the molded record disc 12. The spring 100 maintains the poppet valve 66 in the closed position to prevent drooling of molten disc-forming material from the spure bushing 58. When the mold halves are moved to open the mold cavity 25, pressurized air is supplied through an inlet port 130 in the first mold half 14 to an annular pressure chamber 132 defined between the sprue bushing 58 and the associated support plate 37. The air under pressure witin this annular chamber 132 is directed axially toward the record disc 12 through a plurality of slots 134 to air-eject the record disc 12 from the mold halves 14 and 20. This ejection operation is illustrated in detail in FIG. 4.

The hot sprue valve assembly of this invention thus provides an accurately controlled and guided poppet valve 66 for movement between an open position allowing molten disc-forming material to enter the mold cavity 25, and a closed position to prevent the material from entering the mold cavity. The poppet valve 66 is assisted by an hydraulic ram 104 upon movement to the closed position whereby the poppet valve molds the central aperture 68 within the disc 12 prior to material solidification. Waste of disc-forming material and the possible creation of debris or cracking of the molded record disc 12 is thereby avoided.

Various moldifications and improvements to the hot sprue valve assembly embodiments of this invention are believed to be apparent to one skilled in the art. Accordingly, no limitation upon the invention is intended, except as set forth in the appended claims.

What is claimed is:

1. In an injection molding machine for producing centrally apertured record discs, said machine including a generally disc-shaped mold cavity and a sprue bushing for flow of molten disc-forming material into the mold cavity, a method of controlling flow of the disc-forming material into the mold cavity comprising the steps of:

positioning a poppet valve generally at the end of the sprue bushing adjacent the mold cavity;

biasing the poppet valve to a normal closed position seated upon the adjacent end of the sprue bushing to prevent flow of the molten disc-forming material from the sprue bushing into the mold cavity;

injecting molten disc-forming material into the sprue bushing at a pressure sufficient to force the poppet valve to move generally across the mold cavity to an open position spaced from the sprue bushing to allow flow of the molten disc-forming material through the sprue bushing into the mold cavity;

returning the poppet valve to its closed position by advancing a ram on the side of the mold cavity opposite the sprue bushing into bearing engagement with the poppet valve;

allowing the disc-forming material in the mold cavity to solidify; and ejecting the solidified molded disc from the mold cavity.

2. The method of claim 1 including the steps of supporting the poppet valve by a valve stem received along the axis of the sprue bushing flow path, and guiding said valve stem for sliding movement along the axis of the spure bushing flow path with a plurality of angularly spaced arms projecting radially outwardly from the valve stem.

3. The method of claim 1 including the step of heating the valve stem to maintain the disc-forming material in a molten state within the sprue bushing flow path.

4. The method of claim 3 including the step of heating the ram.

* * * * *